April 18, 1933.   G. WISTRAND   1,904,258

BEARING MOUNTING

Filed Jan. 20, 1930

INVENTOR
GUNNAR WISTRAND
BY
ATTORNEY

Patented Apr. 18, 1933

1,904,258

UNITED STATES PATENT OFFICE

GUNNAR WISTRAND, OF BERLIN, GERMANY, ASSIGNOR TO AKTIEBOLAGET SVENSKA KULLAGERFABRIKEN, OF GOTTENBORG, SWEDEN, A CORPORATION OF SWEDEN

BEARING MOUNTING

Application filed January 20, 1930, Serial No. 422,012, and in Germany April 23, 1929.

When mounting bearings on certain types of machinery, it is in some cases necessary to provide means to enable one of a pair of bearing mountings to be lifted. This is the case in the lower press rolls, couch rolls and felt-washing rolls of paper making machinery in which one end of the roll must be lifted, when it is required to replace the felt or wire. This must be taken into account, when designing the bearing mounting for the application of antifriction bearings to such machines.

In the following the invention is described as applied to mountings for the rolls of paper making machinery.

The usual practice has hitherto been to mount the driving side of the roll on a pair of cylindrical roller bearings mounted in a housing having a spherical outer surface, while on the front side one bearing, preferably of self-aligning type, was found sufficient. The mounting on the driving side thus requiring two bearings and a spherical housing is, therefore, complicated and expensive.

The object of the present invention is to provide a bearing mounting, which while filling the above mentioned requirements is at the same time inexpensive and simple. The invention consists in designing the housing and the supporting plate in such a manner that only one bearing will be required at each end of the roll.

To enable the roll to be lifted on the front side and tilted about a fulcrum on the driving side the bearing housings are constructed as follows: One side of the housing rests on a flat base plate and the other side on a fulcrum located outwardly of the centre line of the bearing. Assuming that the bearing is of the self-aligning type, as illustrated, the inner race of the bearing and the rollers swing in the spherical outer race of the bearing, when the end of the roll is lifted until the stationary and rotating parts of the labyrinth seal come into engagement, after which the roll and bearing housing continue to tilt about the fulcrum. In order to keep the displacement of the parts of the bearing and the sealing within the narrowest possible limits and prevent damage to the sealing surfaces in the labyrinth rings a stop screw is provided close to the inner labyrinth seal. Bearings of self-aligning type are very suitable under the above conditions. It is, however, naturally possible to use standard cylindrical roller bearings. The stop screw then serves the purpose of preventing dangerous radial pressure at the ends of the bearing rollers, when the roll is lifted.

The invention is illustrated in the accompanying drawing, in which

Figure 1:
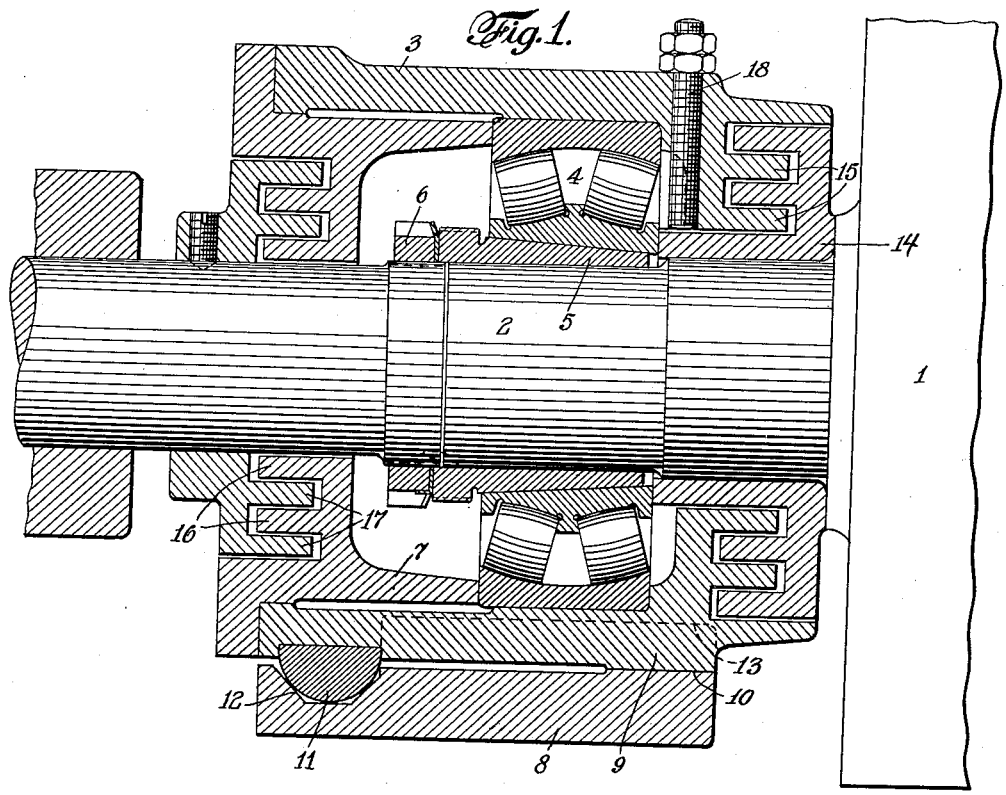
Figure 1 shows a section through a bearing mounting on the driving side of the roll.

In Figure 1 the bearing 4, in this case a self-aligning roller bearing, is fixed to the journal 2 of the roll 1 by means of a withdrawal sleeve 5. The sleeve 5 is held in position axially by means of a nut 6, the inner ring of the bearing 4 taking up a position in engagement with the labyrinth element 14. The bearing 4 is mounted in a housing 3 provided on its inner side with a labyrinth element 15 cooperating with the similar labyrinth element 14 to form a labyrinth seal. On the outer side the rings 16 on the cover 7 cooperate with similar rings on an annular member 17 in a like manner.

The housing 3 is provided in the usual manner with a base 9 on the inner side resting on the plane surface of the base plate 8. On the outer side of the housing the base rests on a fulcrum. In the embodiment illustrated, a fulcrum 11 in the form of a half cylinder is fixed in a suitable manner to the base of the housing and rests with its convex side downwards in a groove 12 in the base plate 8. The housing is kept in position laterally by means of two raised tongues 13. The stop screw 18 is located near the inner seal and is adjusted to such an extent that the clearance between the end of the screw and the labyrinth element 14 is very small.

The mounting operates in the following manner: When the roll is lifted on the front side, the self-aligning bearing adjusts itself, only the small amount required until the outer surface of the labyrinth element 14 engages the end of the screw 18 after which the roll and the housing 3 tilt about the fulcrum 11. The adjustable stop afforded by the screw 18 prevents the labyrinth surfaces 14 and 15, and 16 and 17 respectively, from coming into contact and being damaged.

Figure 2:
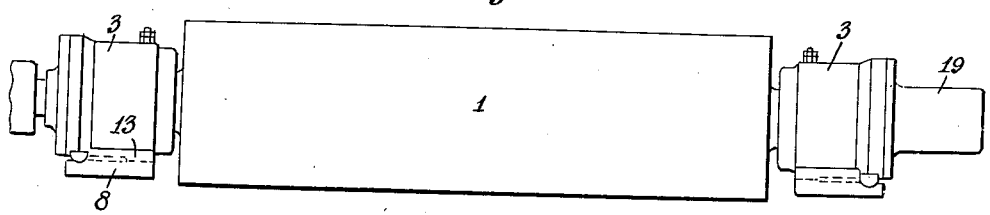
Fig. 2 shows the whole roll with both bearings and base plates.
Figure 3:
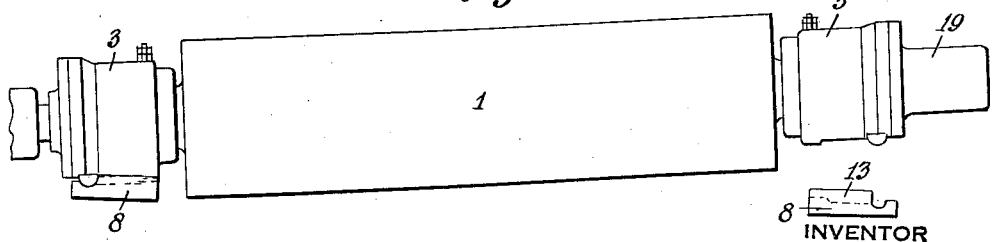
Fig. 3 shows the same roll with one end in raised position.

The general arrangement of the roll and its bearings is shown in Fig. 2. The housings 3 may, if desired, be similar on both sides of the roll with the exception that the cover on the front side housing is provided with an extension 19. This extension forms a handle by means of which the end of the roll can be conveniently raised. In Fig. 3 the roll is illustrated in a raised position to show the manner in which the device functions.

The fulcrum may, if desired, be given other forms than that shown in the drawing. It is thus possible to make use of two or more points instead of the half cylinder illustrated in the drawing.

Various changes may be made within the scope of the claims without departing from the spirit of my invention.

Having described my invention, I claim and desire to secure by Letters Patent:

1. A bearing mounting comprising a housing, a bearing in the housing, there being a fulcrum rigidly formed on the housing and disposed transversely of the bearing axis and located at one side of the central radial plane of the bearing, a base plate having rigid parts for supporting the fulcrum on a fixed axis and other rigid parts for engaging and supporting the housing at the other side of said central plane when the parts are in their normal positions.

2. In combination with a roll formed with a roll neck extending from at least one of its ends, of a bearing mounting, comprising a housing, a bearing mounted on the roll neck and disposed within the housing, there being a fulcrum rigidly formed on the housing and disposed transversely of the bearing axis and located outwardly of the central radial plane of the bearing, a base plate having rigid parts for supporting the fulcrum on a fixed axis and other rigid parts for engaging and supporting the housing inwardly of such central plane when the parts are in normal position.

3. In combination with a roll formed with a roll neck extending from at least one of its ends, of a bearing mounting comprising a housing, a bearing mounted on the roll neck and disposed within the housing, there being a fulcrum rigidly formed on the housing and disposed transversely of the bearing axis and located outwardly of the central radial plane of the bearing, a base plate having rigid parts for supporting the fulcrum on a fixed axis and other rigid parts for engaging and supporting the housing inwardly of such central plane when the parts are in normal position, the housing and plate being formed with interengaging faces for laterally positioning these parts.

4. In combination with a roll formed with a roll neck extending from each of its ends, of a bearing mounted on each of the roll necks, a mounting for each of the bearings comprising a housing, there being a fulcrum rigidly formed on the outer end of such housing and disposed transversely of the bearing axis, and a base plate for each of the housings having rigid parts for supporting the fulcrum on a fixed axis and other rigid parts for engaging and supporting the housing inwardly of the central plane of the bearing when the parts are in normal positions.

Signed at Berlin, Germany, this 19th day of December, 1929.

GUNNAR WISTRAND.